United States Patent
Kato (10) Patent No.: US 9,812,766 B2
(45) Date of Patent: Nov. 7, 2017

(54) ANTENNA DEVICE AND COMMUNICATION APPARATUS

(71) Applicant: Murata Manufacturing Co., Ltd., Nagaokakyo-shi, Kyoto-fu (JP)

(72) Inventor: Noboru Kato, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 128 days.

(21) Appl. No.: 14/855,597

(22) Filed: Sep. 16, 2015

(65) Prior Publication Data

US 2016/0006108 A1 Jan. 7, 2016

Related U.S. Application Data

(63) Continuation of application No. PCT/JP2014/052023, filed on Jan. 30, 2014.

(30) Foreign Application Priority Data

Mar. 25, 2013 (JP) .................................. 2013-061678

(51) Int. Cl.
*H01Q 1/24* (2006.01)
*H01Q 1/22* (2006.01)
(Continued)

(52) U.S. Cl.
CPC .......... *H01Q 1/243* (2013.01); *G06K 7/10336* (2013.01); *H01Q 1/2216* (2013.01);
(Continued)

(58) Field of Classification Search
CPC ............. H01Q 1/243; H01Q 7/00; H01Q 7/06
See application file for complete search history.

(56) References Cited

U.S. PATENT DOCUMENTS

2003/0179151 A1* 9/2003 Senba ................ G06K 19/0723
343/895
2005/0178835 A1* 8/2005 Akiho .................. G06K 7/0008
235/451

(Continued)

FOREIGN PATENT DOCUMENTS

JP 2011-97657 A 5/2011
JP 2011-199343 A 10/2011
(Continued)

OTHER PUBLICATIONS

Official Communication issued in International Patent Application No. PCT/JP2014/052023, dated Apr. 8, 2014.

*Primary Examiner* — Dieu H Duong
(74) *Attorney, Agent, or Firm* — Keating & Bennett, LLP (57) ABSTRACT

A planar conductor including a cutout that penetrates in a thickness direction and extends from an outer edge portion toward an inner side, a coil antenna magnetically coupling with the planar conductor by a magnetic flux passing through the cutout, and a fit-in member filled into at least a portion of the cutout and including a metal oxide film provided on at least a side surface portion thereof which is in contact with the planar conductor, are included. Thus, an antenna device which does not impair appearance while maintaining strength by using a metal casing, and a communication apparatus including the antenna device, are provided.

20 Claims, 5 Drawing Sheets (51) Int. Cl.
*H01Q 7/06* (2006.01)
*H01Q 7/08* (2006.01)
*H04M 1/02* (2006.01)
*G06K 7/10* (2006.01)
*H01Q 7/00* (2006.01)

(52) U.S. Cl.
CPC ............... *H01Q 7/00* (2013.01); *H01Q 7/06* (2013.01); *H01Q 7/08* (2013.01); *H04M 1/026* (2013.01); *H04M 2250/04* (2013.01)

(56) References Cited

U.S. PATENT DOCUMENTS

| | | | |
|---|---|---|---|
| 2009/0295664 A1* | 12/2009 | Kubo | ................ H01Q 1/38 343/788 |
| 2011/0227799 A1 | 9/2011 | Hashimoto | |
| 2011/0287715 A1 | 11/2011 | Matsuura et al. | |
| 2012/0091821 A1 | 4/2012 | Kato et al. | |
| 2012/0262357 A1 | 10/2012 | Kato et al. | |

FOREIGN PATENT DOCUMENTS

| | | | |
|---|---|---|---|
| JP | 2011211611 A | * | 10/2011 |
| JP | 2011-249935 A | | 12/2011 |
| JP | 2011-249938 A | | 12/2011 |
| JP | 2012039654 A | * | 2/2012 |
| JP | 2012-135020 A | | 7/2012 |

* cited by examiner

ANTENNA DEVICE AND COMMUNICATION APPARATUS

BACKGROUND OF THE INVENTION

1. Field of the Invention

The present invention relates to an antenna device preferably for use in an RFID system or a near field radio communication system, and a communication apparatus including the antenna device.

2. Description of the Related Art

In general, in a 13.56 MHz-band RFID system, such as NFC (Near Field Communication), implemented in a mobile terminal, an RFID IC chip and a matching element are mainly mounted on a circuit board, an antenna is attached to the inner side of a terminal casing made of a resin, and the antenna and a terminal on the circuit board are DC-connected to each other via a spring pin or the like.

Meanwhile, a radio communication apparatus such as a recent cellular phone terminal has been thinned. In order to deal with insufficiency of strength due to thinning, a resin casing is subjected to magnesium plating or a metal casing is used to "metalize" the casing to supplement strength of the cases. However, when the casing is "metalized", an antenna included in the terminal is shielded by a metal, and thus a problem arises that communication with a counterpart apparatus is disenabled.

Therefore, an antenna device has been proposed which has a structure in which a metal plate having a larger area than that of an antenna coil is caused to be close to (magnetically coupled with) the antenna coil, and is used as a radiator, as in Japanese Unexamined Patent Application Publication No. 2011-97657.

However, in Japanese Unexamined Patent Application Publication No. 2011-97657, a slit is formed in the metal plate. Thus, in the case where the metal plate is a part of a casing of a radio communication apparatus, there is a problem in that limitations on design arise (appearance is impaired) due to exposure of the slit.

SUMMARY OF THE INVENTION

Therefore, preferred embodiments of the present invention provide an antenna device that does not impair the appearance of a metal casing while maintaining the strength of the metal casing, and a communication apparatus including the antenna device.

A preferred embodiment of the present invention includes a metal casing including a cutout portion that penetrates in a thickness direction and extends from an outer edge portion toward an inner side; a coil antenna magnetically coupling with the metal casing by a magnetic flux passing through the cutout portion; and a conductive member filled into a portion or an entirety of the cutout portion and including an insulating thin film provided on at least a portion thereof which is in contact with the metal casing.

In this configuration, since the conductive member with the insulating thin film formed thereon is provided in the cutout portion in the metal casing which defines and functions as a radiation plate of the antenna device, it is possible to make it difficult to visually recognize the cutout portion in a plan view. As a result, it is possible to use the metal casing as a magnetic field radiation element of an antenna while maintaining the strength of the metal casing. In addition, it is made difficult to recognize the boundary of the cutout portion at the metal casing, and it is possible to reduce a possibility that the appearance is impaired.

In this configuration, it is possible to cause the color or material of a portion of the conductive member other than the portion with the insulating thin film provided thereon to be the same as that of the metal casing, thus it is possible to make it further difficult to recognize the boundary of the cutout portion at the metal casing, and it is possible to reduce the possibility that the appearance is impaired.

The conductive member is preferably made of the same material as that of the metal casing.

In this configuration, it is possible to make it further difficult to recognize the boundary of the cutout portion at the metal casing, and it is possible to reduce the possibility that the appearance is impaired.

The cutout portion may include an opening and a slit connecting the opening and the outer edge portion, and the conductive member may be filled in the slit.

In this configuration, for example, in the case where the antenna device is used in a cellular phone, by using an existing opening for a camera module portion or the like, it is possible to cause a metal casing of the cellular phone to define and function as a radiation plate for a magnetic field signal.

Preferably, the coil antenna includes a coil conductor located on an insulator layer, and the coil conductor includes a coil opening located at a position at which the coil opening overlaps at least a portion of the opening in a plan view.

In this configuration, since the thin coil antenna is used, it is possible to thin the antenna device.

The coil antenna may have a multilayer structure in which a plurality of insulator layers each including a coil conductor provided thereon are laminated, and the coil opening may face the cutout portion.

In this configuration, even when a winding axis of the coil antenna is not perpendicular to a flat surface of the metal casing, it is possible to cause the metal casing to define and function as a radiation plate by disposing the cutout portion in an extension direction of the winding axis.

According to various preferred embodiments of the present invention, it is possible to realize an antenna device which allows a metal casing to be used as a magnetic field radiation element of an antenna while maintaining the strength of the metal casing, and does not impair the appearance of the metal casing, and a communication apparatus including the antenna device.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred Embodiment 1

Figure 1:
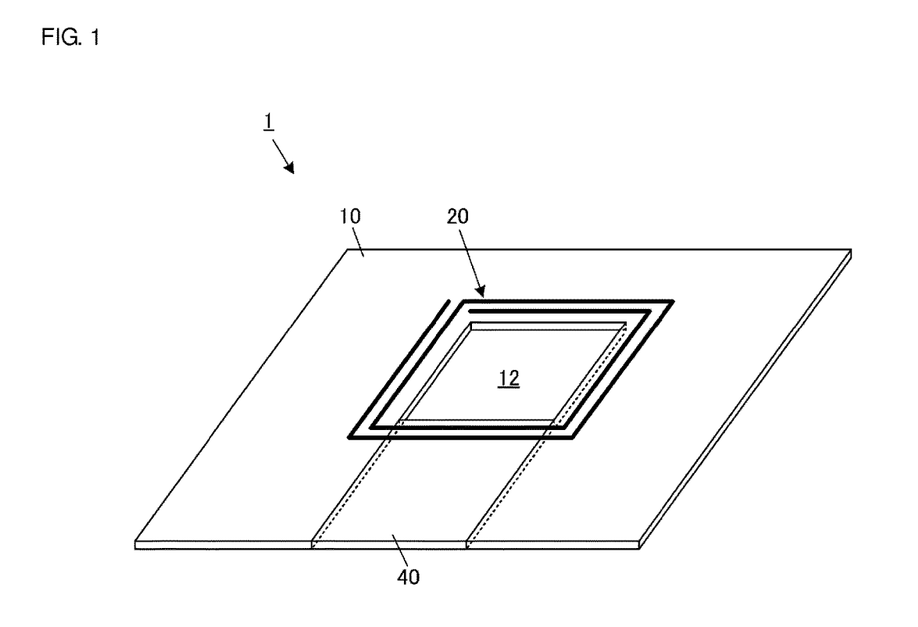
FIG. 1 is a perspective view of an antenna device according to a first preferred embodiment of the present invention.
Figure 2:
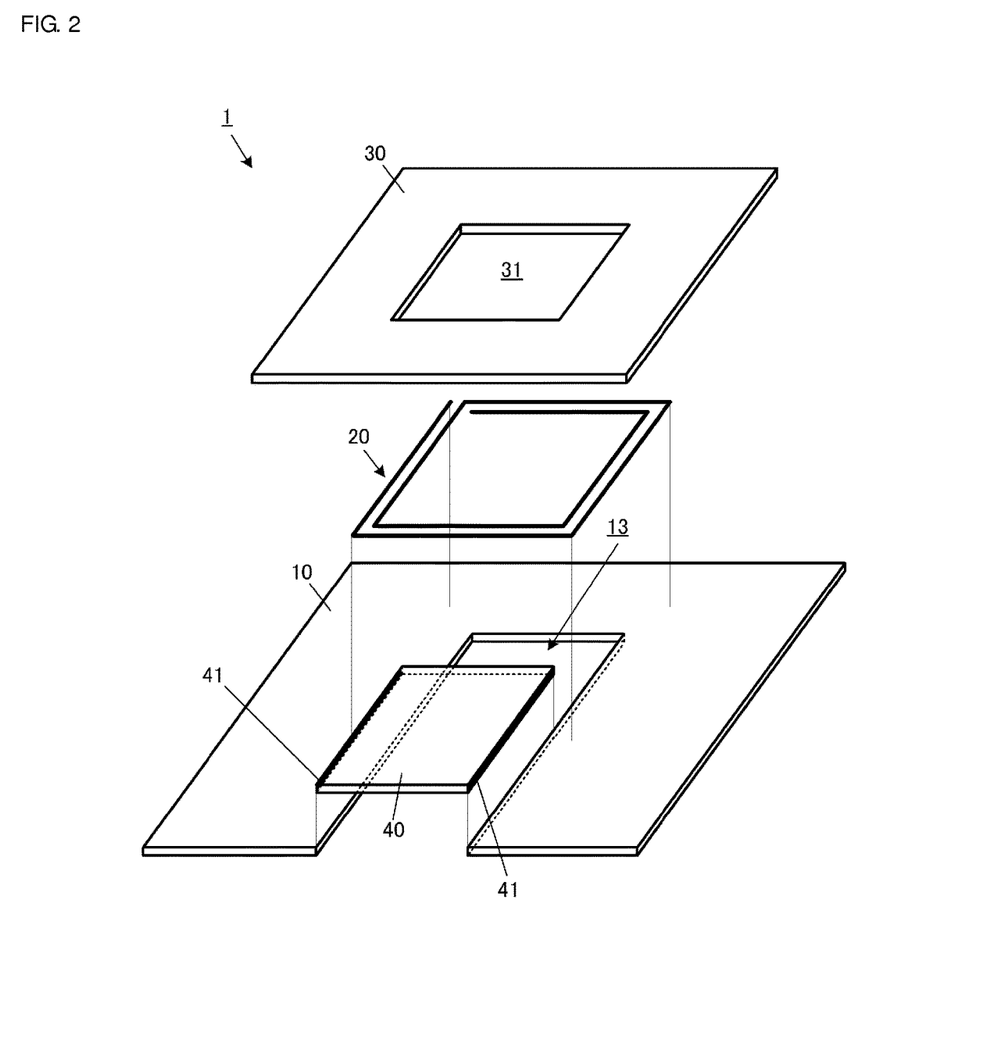
FIG. 2 is an exploded perspective view of the antenna device of FIG. 1.

FIG. 1 is a perspective view of an antenna device according to Preferred Embodiment 1 of the present invention. FIG. 2 is an exploded perspective view of the antenna device. The antenna device 1 preferably is an antenna device using a high-frequency signal in an HF band (13.56 MHz band) as a carrier frequency, and is preferably configured as a reader/writer antenna device for use in an NFC system, for example. The antenna device 1 includes a planar conductor 10, a coil antenna 20, and a ferrite magnetic material 30. In FIG. 1, the ferrite magnetic material 30 is not shown.

The planar conductor 10 is, for example, a portion of a metal casing of a communication apparatus equipped with the antenna device 1. The metal casing is, for example, formed of aluminum. As shown in FIG. 2, the planar conductor 10 includes a rectangular or substantially rectangular cutout 13 that extends inward from a portion of an outer edge. A fit-in member (conductive member) 40 is provided in a portion of the cutout 13. Accordingly, an opening 12 is located in the planar conductor 10 as shown in FIG. 1. The portion of the cutout 13 in which the fit-in member 40 is provided corresponds to a "cutout portion" and a "slit".

On a side surface of the fit-in member 40 which is a portion which is in contact with the planar conductor 10 in the case where the fit-in member 40 is provided in the cutout 13, a metal oxide film (insulating thin film) 41 having a thickness of about several micrometers, for example, is provided. In the present preferred embodiment, the fit-in member 40 is preferably made of aluminum, which is the same material as that of the planar conductor 10, and the metal oxide film 41 is preferably made of aluminum oxide. Since the material of the fit-in member is preferably the same as that of the planar conductor 10, the color of each of the fit-in member 40 and the metal oxide film 41 is the same or substantially the same as that of the planar conductor 10, and it is difficult to visually recognize the boundary between the planar conductor 10 and the fit-in member 40. In addition, since the metal oxide film 41 has insulation properties, a non-isolated gap having a size equivalent to the thickness of the metal oxide film 41 is provided between the planar conductor 10 and the fit-in member 40.

The coil antenna 20 is preferably configured as a rectangular or substantially rectangular helical-shaped conductor pattern provided on one surface of an insulator base material which is not shown. The coil antenna 20 has a coil opening larger than the opening 12, and is disposed closely to the planar conductor 10 such that the coil opening overlaps the opening 12. An RFIC (not shown) as a power supply circuit which feeds a signal in a HF band is connected to the coil antenna 20. Since the coil antenna 20 that is preferably defined by a rectangular or substantially rectangular helical-shaped coil pattern on the one surface of the insulator base material is disposed closely to the planar conductor 10, it is possible to thin the antenna device 1. The coil antenna 20 may be disposed such that the opening 12 falls within the coil opening, or may be disposed such that a portion of the coil opening overlaps the opening 12.

At a back side of the coil antenna 20 (a side opposite to the planar conductor 10 side), the ferrite magnetic material including an opening 31 is provided. The opening 31 is preferably the same or substantially the same in shape and size as the coil opening of the coil antenna 20 and the opening 12 of the planar conductor. Since the ferrite magnetic material 30 is disposed, it is possible to obtain a high inductance value even with a small coil antenna. In addition, it is possible to prevent unnecessary coupling with a ground pattern or the like on another circuit board disposed closely to the coil antenna 20.

A non-limiting example of a method for forming the fit-in member 40 in the cutout 13 is a method in which a metal oxide film is formed on a fit-in member thicker than the planar conductor 10, and the fit-in member is squeezed into the cutout 13 and then ground to be flush with the planar conductor 10. The fit-in member 40 and the planar conductor are mechanically joined to each other preferably by an adhesive or the like. Thus, it is possible to use the metal casing as a radiation element of an antenna element while the mechanical strength of the metal casing is maintained, and the appearance of the metal casing is not impaired.

Figure 3:
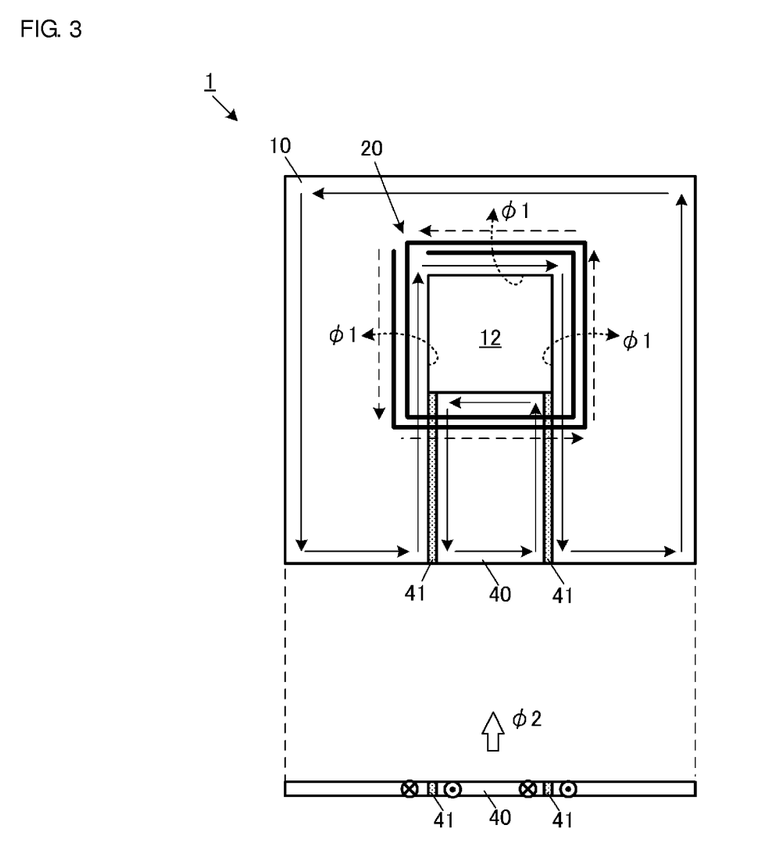
FIG. 3 is a conceptual diagram showing a current flowing through the antenna device and a magnetic flux generated in the antenna device of FIG. 1.

FIG. 3 is a conceptual diagram showing a current flowing through the antenna device 1 and a magnetic flux generated in the antenna device 1. In FIG. 3, for convenience of explanation, the metal oxide film 41 is shown thicker than actual size, but is actually a thin film having a thickness of several micrometers, for example. In FIG. 3, a dashed arrow indicates the direction of the current flowing through the coil antenna 20. When the current flows, a magnetic flux $\phi 1$ is generated as shown in FIG. 3. The magnetic flux $\phi 1$ passes through the opening 12, so that the coil antenna 20 and the planar conductor 10 magnetically couple with each other. As a result, a current shown by a solid arrow in FIG. 3 is induced in the planar conductor 10.

The planar conductor 10 and the fit-in member 40 are insulated from each other by the metal oxide film 41. In other words, this can be synonymous with a slit being located between the planar conductor 10 and the fit-in member 40. Thus, the current flowing along the opening 12 flows along this slit, and flows mainly along the edge of the planar conductor 10 due to an edge effect. In addition, the current flows along the edge also within the fit-in member 40. As a result, a magnetic flux $\phi 2$ in the direction of an arrow in FIG. 3 is generated from the planar conductor 10. Thus, the planar conductor 10 defines and functions as a radiation plate of the antenna device 1.

In the antenna device 1, the inductance of the planar conductor 10, and a capacitance between the planar conductor 10 and the fit-in member 40, specifically, a capacitance of a non-conductive gap portion generated by the metal oxide film 41, define an LC resonant circuit. The capacitance changes depending on the area in which the planar conductor 10 and the fit-in member 40 face each other, or the distance between the planar conductor 10 and the fit-in member 40. However, since the thickness of the metal oxide film 41 is several micrometers, for example, the distance between the planar conductor 10 and the fit-in member 40 is short, and the capacitance is high. That is, it is possible to decrease the resonant frequency of the LC resonant circuit. By causing the resonant frequency to be close to a use frequency, it is possible to improve antenna characteristics.

As described above, although it is necessary to provide the cutout 13 in order to cause the planar conductor 10 to define and function as a radiation plate of the antenna device 1, since the fit-in member 40 whose material is the same as that of the planar conductor 10 is provided in the cutout 13, it is possible to make it difficult to recognize that the cutout 13 is provided, when being seen in a plan view. In addition, by causing the metal oxide film 41, which insulates the planar conductor 10 and the fit-in member 40 from each other, to be as thin as possible, it is possible to make it difficult to recognize the boundary between the planar conductor 10 and the fit-in member 40, and it is possible to ensure a high capacitance.

Figure 4:
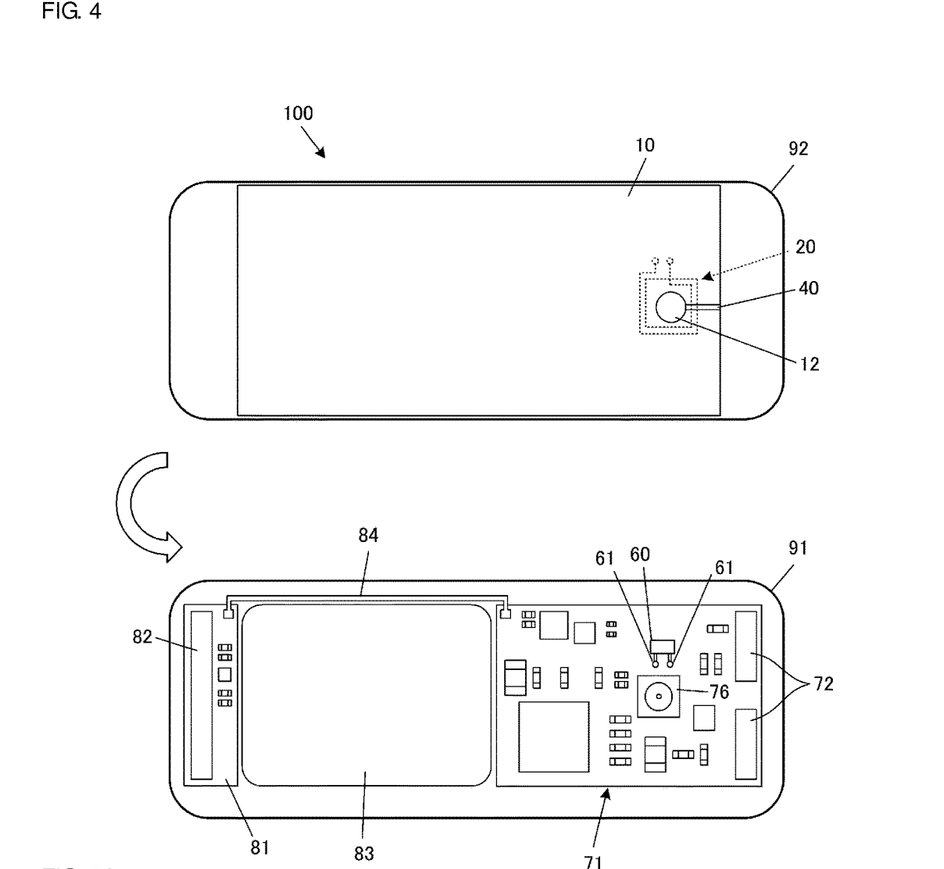
FIG. 4 is a diagram showing the internal structure of a casing of a radio communication apparatus to which the antenna device according to a preferred embodiment of the present invention is applied.

FIG. 4 is a diagram showing the internal structure of a casing of a radio communication apparatus to which the antenna device 1 according to the present preferred embodiment is applied. FIG. 4 is a plan view in a state where an upper casing 91 and a lower casing 92 of a radio communication apparatus 100 are separated from each other to expose the inside of the radio communication apparatus 100. In this example, the lower casing is made of a resin, and a portion thereof to increase the strength is provided as the planar conductor 10. However, a portion excluding a portion which interferes with radiation of an UHF-band antenna may be metalized.

Within the upper casing 91, circuit boards 71 and 81, a battery pack 83, and the like are housed. An RFIC 60 including a communication circuit, and the like are mounted on the circuit board 71. A UHF-band antenna 72, a camera module 76, and the like are also mounted on the circuit board 71. In addition, a UHF-band antenna 82 and the like are mounted on the circuit board 81. The circuit board 71 and the circuit board 81 are connected to each other via a coaxial cable 84.

A cutout is provided in the planar conductor 10 of the lower casing 92, and the fit-in member 40 is provided in a portion of the cutout. Since the fit-in member 40 is provided in the cutout, the opening 12 is provided in the planar conductor 10. In FIG. 4, the opening 12 preferably has a circular or substantially circular shape. When the upper casing 91 and the lower casing 92 are mounted, a lens of the camera module 76 is disposed so as to be optically exposed from the opening 12. In addition, the coil antenna 20 to which the RFIC 60 is connected via connection pins 61 is disposed closely to the opening 12.

As described above, it is possible to cause the planar conductor 10, which is a portion of the casing, to define and function as a radiation plate of the antenna device. Furthermore, since the fit-in member 40 is provided in the cutout which is configured such the planar conductor 10 defines and functions as a radiation plate, it is made difficult to recognize that the cutout is provided, and it is made difficult to recognize the boundary line between the planar conductor 10 and the fit-in member 40. Thus, the appearance of the radio communication apparatus 100 is not impaired.

Furthermore, the opening 12 is preferably used for the camera module 76 of the radio communication apparatus 100. By using the opening 12, it is not necessary to additionally provide an opening in the planar conductor 10. That is, by using the existing structure, it is possible to cause the metal casing of the radio communication apparatus 100 to define and function as a radiation plate.

Preferred Embodiment 2

Figure 5A:
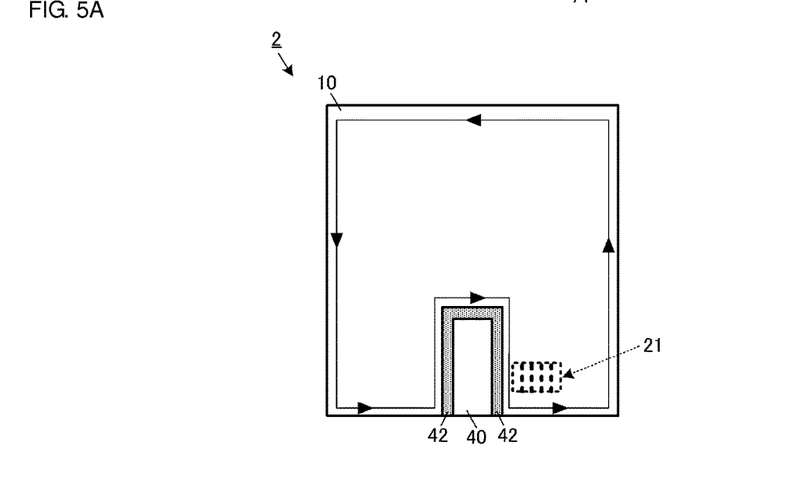
FIG. 5A is a plan view of an antenna device according to a second preferred embodiment of the present invention.
Figure 5B:
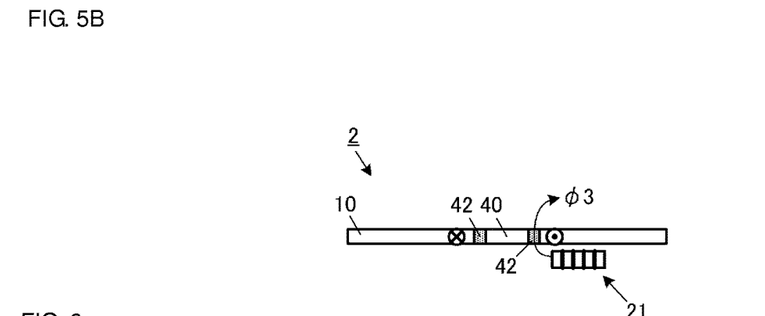
FIG. 5B is a front view of the antenna device according to the second preferred embodiment of the present invention.

FIG. 5A is a plan view of an antenna device according to Preferred Embodiment 2 of the present invention, and FIG. 5B is a front view of the antenna device according to Preferred Embodiment 2. The present preferred embodiment is different from Preferred Embodiment 1 in that the opening 12 according to Preferred Embodiment 1 is not included and in the coil antenna.

The antenna device 2 includes a planar conductor 10 including a rectangular or substantially rectangular cutout (not shown), a fit-in member 40 provided in the cutout, and a coil antenna 21 which magnetically couples with the planar conductor 10. The material of the fit-in member 40 preferably is the same as that of the planar conductor 10, and preferably is the same or substantially the same in size as that of the cutout in the planar conductor 10. A metal oxide film 42 having a thickness of several micrometers, for example, is provided on a contact surface of the fit-in member 40 which is in contact with the planar conductor 10. Since the fit-in member 40 is provided in the entire cutout in the planar conductor 10, it is possible to make it difficult to recognize the boundary between the planar conductor 10 and the fit-in member 40, similarly to Preferred Embodiment 1.

The coil antenna 21 includes a magnetic core which is an insulator layer, and a coil conductor, and the coil conductor is preferably defined by a pattern which is wound around the magnetic core. The coil conductor may be a conductive wire wound around the magnetic core, or may be a conductor pattern in a multilayer body including a magnetic layer. An RFIC which is a power supply circuit is connected to the coil antenna 21. The coil antenna 21 is disposed close to a gap, between the planar conductor 10 and the fit-in member 40, which is defined by the metal oxide film 42, such that the coil opening faces the gap.

A magnetic flux φ3 from the coil antenna 21 disposed as described above passes through the gap between the planar conductor 10 and the fit-in member 40 as shown in FIG. 5B, so that the planar conductor 10 and the coil antenna 21 magnetically couple with each other. In a direction shown by a solid arrow in FIG. 5A, a current flows mainly along the edge of the planar conductor 10 due to an edge effect. As a result, similarly to Preferred Embodiment 1, a magnetic flux is generated from the planar conductor 10. Thus, the planar conductor 10 defines and functions a radiation plate of the antenna device 2.

Figure 6:
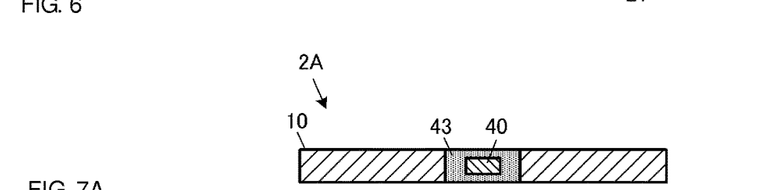
FIG. 6 is a front cross-sectional view of another example of the antenna device according to the second preferred embodiment of the present invention.

FIG. 6 is a front cross-sectional view of another example of the antenna device 2 according to Preferred Embodiment 2. In the antenna device 2A shown in FIG. 6, a metal oxide film 43 covers not only a contact portion of the fit-in member 40 which is in contact with the planar conductor 10, but also the entirety of the fit-in member 40.

Even with the configurations of these antenna devices 2 and 2A, it is possible to make it difficult to recognize the boundary between the planar conductor 10 and the fit-in member 40. Even in the case where the antenna device 2 or 2A is mounted on the radio communication apparatus 100 and the planar conductor 10 is defined as a portion of the casing, the appearance of the radio communication apparatus is not impaired.

Preferred Embodiment 3

Figure 7A:
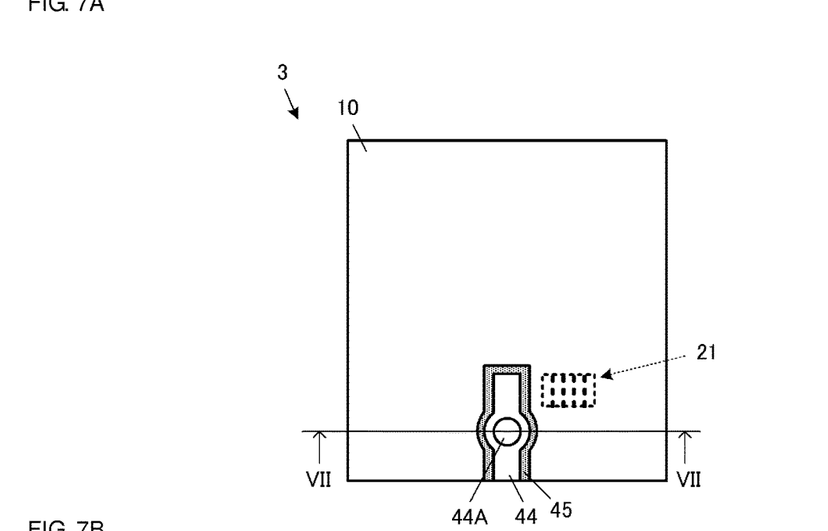
FIG. 7A is a plan view of an antenna device according to a third preferred embodiment of the present invention.
Figure 7B:
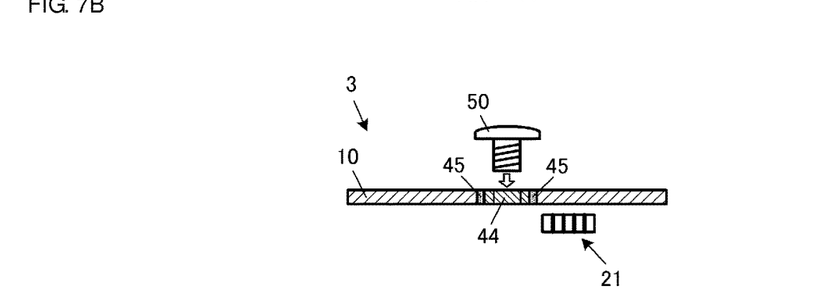
FIG. 7B is a front cross-sectional view taken along a line VII-VII in FIG. 7A.

FIG. 7A is a plan view of an antenna device according to Preferred Embodiment 3 of the present invention, and FIG. 7B is a front cross-sectional view taken along a line VII-VII in FIG. 7A. The present preferred embodiment is different from Preferred Embodiment 2 in that the fit-in member is held by a screw or other suitable joining member or material to stabilize the fit-in member.

Similarly to Preferred Embodiment 2, a cutout is provided in the planar conductor 10, and a fit-in member 44 is provided in the cutout. The fit-in member 44 has a shape which preferably is rectangular or substantially rectangular and bulges at a central or substantially central portion thereof in a curved manner. The central portion of the fit-in member 44 has a screw hole 44A. A metal oxide film 45 is provided on a contact portion of the fit-in member 44 which is in contact with the planar conductor 10, and the fit-in member 44 is provided in the cutout of the planar conductor 10.

As shown in FIG. 7B, a screw 50 is inserted into the screw hole 44A of the fit-in member 44. For example, in the case where the planar conductor 10 is fixed to a plastic or the like which is not shown, it is possible to also fix the fit-in member 44 to the plastic the screw 50, for example. An oxide film is provided on the surface of the screw 50. Thus, when the fit-in member 44 is fixed by the screw 50, the screw 50 is configured not to be brought into conduction even when contacting the fit-in member 44 and the planar conductor 10.

Since the fit-in member 44 is fixed the screw 50 as described above, it is possible to prevent the fit-in member 44 from being peeled off from the planar conductor 10. In addition, since the fit-in member 44 is provided, it is possible to make it difficult to visually recognize the boundary between the planar conductor 10 and the fit-in member 44 to prevent the appearance from being impaired, and it is also possible to use the head of the screw 50 as a part of the design.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device comprising:
a metal casing including a cutout portion penetrating in a thickness direction and extending from an outer edge portion toward an inner side;
a coil antenna magnetically coupling with the metal casing by a magnetic flux passing through the cutout portion; and
a conductive member provided in a portion or an entirety of the cutout portion and including an insulating thin film provided on at least a portion thereof which is in contact with the metal casing; wherein
when seen in a plan view of the conductive member, the coil antenna includes a portion that does not overlap the conductive member.

2. The antenna device according to claim 1, wherein the conductive member is made of a same material as that of the metal casing.

3. The antenna device according to claim 1, wherein
the cutout portion includes an opening and a slit connecting the opening and the outer edge portion; and
the conductive member is provided in the slit.

4. The antenna device according to claim 3, wherein
the coil antenna includes a coil conductor provided on or in an insulator layer; and
the coil conductor includes a coil opening located a position at which the coil opening overlaps at least a portion of the opening in a plan view.

5. The antenna device according to claim 1, wherein
the coil antenna has a multilayer structure in which a plurality of insulator layers each including a coil conductor provided thereon are laminated; and
the coil opening faces the cutout portion.

6. The antenna device according to claim 1, wherein the antenna device is a reader/writer antenna device capable of being used in an NFC system.

7. The antenna device according to claim 1, wherein a portion of the metal casing including the cutout portion defines a planar conductor of the antenna device.

8. The antenna device according to claim 7, wherein the planar conductor includes an opening.

9. The antenna device according to claim 8, wherein the coil antenna has a coil opening larger than the opening in the planar conductor and the coil opening overlaps or falls within the opening in the planar conductor.

10. The antenna device according to claim 8, wherein a lens of a camera is disposed so as to be optically exposed from the opening in the planar conductor.

11. The antenna device according to claim 7, wherein a color of the conductive member and the insulating thin film is the same or substantially the same as a color of the planar conductor.

12. The antenna device according to claim 7, wherein a non-isolated gap having a size equivalent to a thickness of the insulating thin film is provided between the planar conductor and the conductive member.

13. The antenna device according to claim 7, wherein the planar conductor defines and functions as a radiation plate of the antenna device.

14. The antenna device according to claim 1, wherein the cutout portion is rectangular or substantially rectangular cutout portion.

15. The antenna device according to claim 1, wherein the insulating thin film is a metal oxide film.

16. The antenna device according to claim 1, wherein the conductive member is made of aluminum and the insulating thin film is made of aluminum oxide.

17. The antenna device according to claim 1, wherein the coil antenna is defined by a rectangular or substantially rectangular helical-shaped conductor pattern provided on one surface of an insulator base material.

18. The antenna device according to claim 1, wherein a ferrite magnet material is provided at a back side of the coil antenna, and the ferrite magnet material includes an opening that has a same size or substantially a same size as the coil opening.

19. The antenna device according to claim 1, wherein the coil antenna includes a magnetic core which is an insulator layer, and a coil conductor defined by a pattern which is wound around the magnetic core, and the coil conductor is one of a conductive wire wound around the magnetic core and a conductor pattern in a multilayer body including a magnetic layer.

20. A communication apparatus comprising an antenna device according to claim 1, wherein the metal casing defines an exterior of the communication apparatus.

* * * * *